United States Patent [19]
Hatakeyama

[11] Patent Number: 5,696,564
[45] Date of Patent: Dec. 9, 1997

[54] VIDEO PROJECTOR

[75] Inventor: Atsushi Hatakeyama, Ibaraki, Japan

[73] Assignee: Matsushita Electric Industrial Co., Ltd., Osaka, Japan

[21] Appl. No.: 608,521

[22] Filed: Feb. 28, 1996

[30] Foreign Application Priority Data

Mar. 16, 1995 [JP] Japan .................... 7-057213

[51] Int. Cl.$^6$ .................... H04N 5/74; H04N 9/31; G02C 1/00
[52] U.S. Cl. .................... 348/756; 348/750; 349/8; 353/34
[58] Field of Search .................... 348/751, 756, 348/761, 766, 786; 353/20, 30, 31, 38, 52, 40, 84, 37, 99, 34; 359/40, 42, 49; 349/8, 106; H04N 9/31, 5/74

[56] References Cited

U.S. PATENT DOCUMENTS

| 5,260,730 | 11/1993 | Williams et al. | 353/121 |
| 5,379,080 | 1/1995 | Onozuka | 353/37 |
| 5,459,592 | 10/1995 | Shibatani et al. | 359/40 |
| 5,493,351 | 2/1996 | Hamagishi et al. | 359/40 |

FOREIGN PATENT DOCUMENTS

| 0 409 620 | 1/1991 | European Pat. Off. |
| 0 477 028 | 3/1992 | European Pat. Off. |
| 2-253291 | 10/1990 | Japan |

*Primary Examiner*—Michael H. Lee
*Attorney, Agent, or Firm*—Ratner & Prestia

[57] ABSTRACT

A video projector including a light source and a light valve for receiving light emitted from the light source. A first filter is disposed between the light source and the light valve. The first filter removes light having a bandwidth ranging from ultraviolet to a wavelength within the visible spectrum of light and infrared light from the light emitted from the light source. A second filter is disposed between the first filter and the light valve. The second filter removes light having a bandwidth ranging from ultraviolet to a wavelength within the visible spectrum of light.

10 Claims, 3 Drawing Sheets

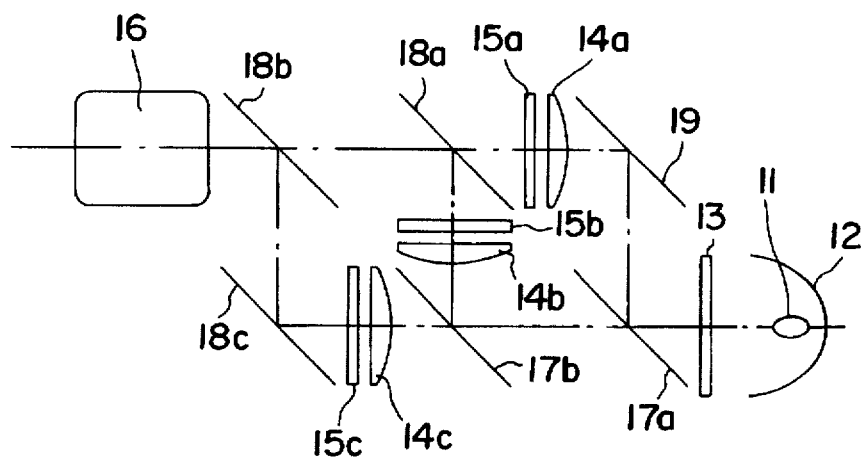
F I G. 1
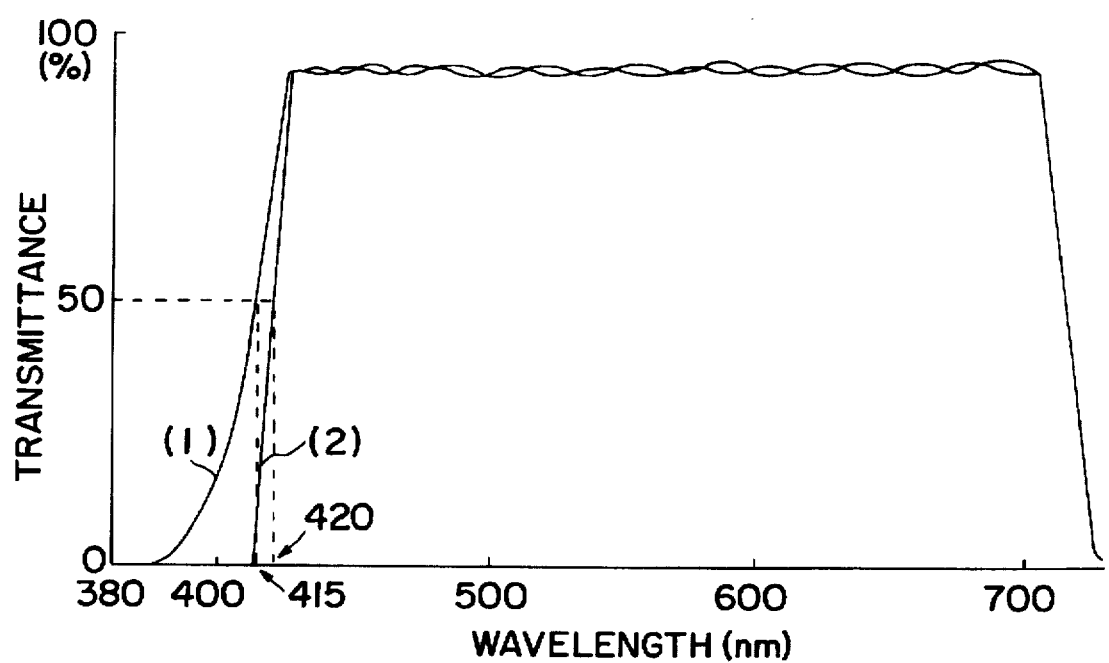
F I G. 2

1
VIDEO PROJECTOR

BACKGROUND OF THE INVENTION

The present invention relates to a video projector which projects an optical image onto a screen, more particularly, relates to an apparatus for removing light having a bandwidth ranging from ultraviolet light to a wavelength within the visible spectrum of light out of the light emitted from a light source.

Recently, a television receiver (TV) having a bigger screen size has been preferred by consumers. However, in the case of the TV including a Cathode Ray Tube (CRT), a bigger screen size results in a much heavier weight. For example, a TV having 37" screen size weighs as much as 80 kg. This is too heavy for consumer use.

A light weight video projector has drawn attention as a replacement for a TV employing a CRT. The video projector uses a light valve, where light modulation is conducted based on video signals. The light valve is implemented with a transmission Liquid Crystal Display (LCD) panel which is a popular device among engineers because the weight of the LCD video projector can be drastically reduced.

FIG. 6 illustrates a basic optical system employed in a conventional LCD video projector. Light emitted from a light source 1 and reflected light from a reflecting mirror 2 (concave mirror) are provided to a filter 3 which removes ultraviolet light (more precisely, light having a bandwidth ranging from ultraviolet to a wavelength within the visible spectrum of light) as well as infrared light. The remaining light, after this removal, is a specimen of transmitted light having a wavelength ranging from approximately 420 nm to 700 nm (visible light), and this transmitted light is collimated through a collimating lens 4 and provided to a LCD light valve 5. The LCD light valve 5, in response to a video signal fed thereto, either transmits or cuts off the incoming beam. The beam transmitted through the light valve 5 is magnified and projected onto a screen (not shown) by a projection lens 6.

The conventional LCD video projector generally uses a 180W metal halide lamp as the light source 1, and uses a UVIR (ultraviolet and infrared) cut filter made of multilayered dielectric film as the filter 3. Two kinds of UVIR cut filters are available. One is a reflection filter which reflects both ultraviolet light and infrared light. The other is an absorbing filter which absorbs ultraviolet light but reflects infrared light. The reflection filter has been widely used as the filter 3. However, as characteristic curve (1) of the spectrum transmission factor shown in FIG. 7 clearly shows, the reflection filter has a gentle slope of a gradually sloping transmission rate around the ultraviolet light wavelengths, and the spectrum transmission factor is not always adequate. Recently, the absorbing filter, featuring a steep slope and excellent spectrum transmission factor as illustrated by a characteristic curve (2) in FIG. 7, was developed and is now in use.

Users of LCD video projectors desire a bigger size and lighter screen. In order to meet these requirements, two measures are taken:. One is to increase the intensity of the light source 1, and the other is to increase the mount of light by enlarging the diameter of the reflecting mirror 2. For instance, the 180W metal halide lamp is replaced with a 250W lamp. The replacement, however, produces the following problems. When increasing the power consumption of the light source 1, the temperature of the filter 3 naturally rises. When the power consumption of light source 1 is 180W, the temperature of filter 3 stays no more than 180° C.

This temperature rises to 250° C. when the light source increases to 250W. If the absorbing filter is used, its maximum operating temperature is 180° C., above which the absorbing filter has unreliable characteristics. Therefore, to lower the temperature of the absorbing filter a cooling fan is used. In this case, inhomogenous temperature distribution occurs in the absorbing filter and generates distortion therein, which makes the absorbing filter subject to damage. Thus, it is very difficult to use a metal halide lamp of a higher power consumption than 180W.

On the other hand, the operating temperature of the reflection filter is as high as 300° C. Accordingly, when using the reflection filter, no problems occur concerning heat resistance. However, as shown by characteristic curve (1) of FIG. 7, since the reflection filter has an inferior spectrum transmission factor, transmission of wave lengths less than 420 nm increases in response to increasing the intensity of the light source 1. This ultraviolet light and its nearby light shorten the lifetime of the light valve and deteriorate a polarizing plate mounted thereto. To avoid these disadvantages, the reflection filter having a wavelength $\lambda$ (50)=420 nm can be replaced with another reflection filter having a 430 nm wavelength to reduce a transmission of ultraviolet light, where $\lambda$(50) represents the wavelength at a transmission factor of 50%. In this case, a part of the blue light is also removed, and the screen dims noticeably. When using the reflection filter, another problem occurs. The diameter of the reflecting mirror is enlarged so as to generate more light, which entails an enlargement of the convergent angle or the divergent angle. A path length of the light transmitted through the dielectric film is changed according to an angle of the incoming light into the reflection filter. Depending on an the angle against the filter, vertical or other angles, a light path length is changed which shifts the wavelength and generates irregular blue color. The light shifted to the shorter wavelength becomes ultraviolet or near-ultraviolet light, which results in increasing both ultraviolet light and near-ultraviolet light transmitted through the reflection filter.

Thus, the conventional LCD video projector has problems such as less reliability and an occurrence of irregular colors when enlarging the screen size as well as increasing the screen brightness.

SUMMARY OF THE INVENTION

The present invention provides a video projector having superior reliability and superior color-uniformity.

The video projector of the present invention comprises a light source, a light valve to which outgoing light emitted from the light source comes into, a first filter means disposed between the light source and the light valve for removing the light having a bandwidth ranging from ultraviolet to a wavelength within the visible spectrum of light as well as infrared light out of the outgoing light, and a second filter means disposed between the first filter means and the light valve for removing the light having a bandwidth ranging from ultraviolet to a wavelength within the visible spectrum of light. For the second filter means, in particular, it is recommended to use a filter having a spectrum transmission factor such that a wavelength $\lambda$(50) indicating a transmission rate of 50% at the second filter means is a longer wavelength side than the wavelength $\lambda$(50) of the first filter means.

When the second filter means having the above spectrum transmission factor is used, ultraviolet and near-ultraviolet light which typically remains if a higher power consumption light source is used, is removed. It also removes the ultraviolet and near-ultraviolet light generated by a wavelength shift in the first filter means.

BRIEF DESCRIPTION OF THE DRAWINGS

FIG. 1 illustrates an optical system of a video projector according to a first embodiment.

FIG. 2 shows spectrum transmission characteristics curves of both a reflection UVIR cut filter and an absorbing UV cut filter used in the video projector shown in FIG. 1.

DESCRIPTION OF THE PREFERRED EMBODIMENTS

Figure 3:
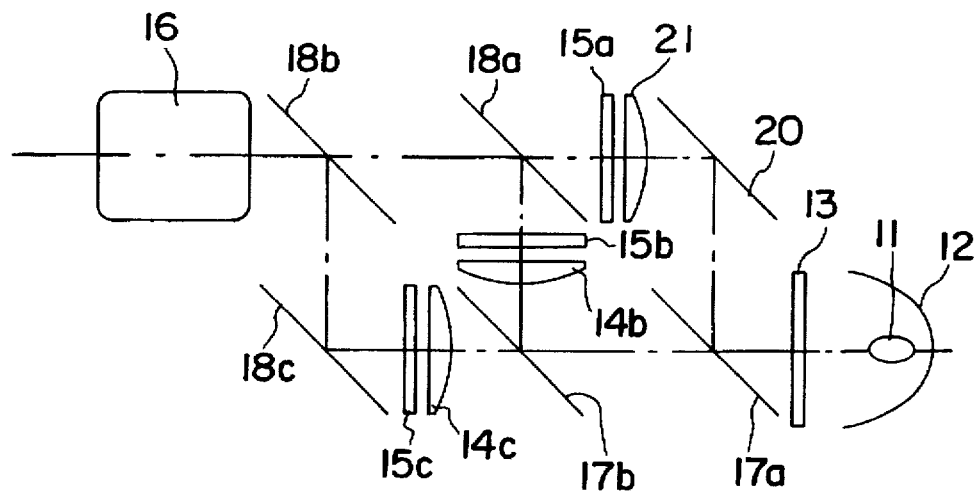
FIG. 3 illustrates an optical system of a video projector according to a second embodiment.

A first exemplary embodiment is now explained with reference to FIG. 1 and FIG. 2.

A three-panel-LCD video projector shown in FIG. 1 employs a 250W metal halide lamp as a light source 11, a transmission LCD panel as a blue light vane 15a, red light valve 15b and green light valve 15c, respectively. Each light valve has a diagonal length of 1.3 inches.

A first filter 13 employs a reflection UVIR cut filter having a wavelength λ(50) indicating a transmission rate of 50%, of 415 nm in light having a bandwidth ranging from ultraviolet to a wavelength within the visible spectrum of light. The curve (1) in FIG. 2 shows the characteristics of this filter. This UVIR cut filter has the following structure. Dielectric films are deposited in multilayers on a glass substrate, e.g. silicon dioxide film and titanium oxide film are deposited one after another in several dozens layers.

A UV absorbing minor 19 which functions as second filter comprises a glass substrate absorbing light having bandwidths ranging from ultraviolet to a wavelength within the visible spectrum of light as well as reflecting visible light. The UV absorbing mirror 19 has the following structure. Silver or aluminum is deposited on the rear side of a glass substrate. This mirror has the same spectrum transmission factor as the absorbing UV cut filter of which the spectrum transmission factor is shown by the curve (2) in FIG. 2. The wavelength λ(50) of mirror 19 is 420 nm.

The light emitted from the light source 11 and the light reflected by the reflection mirror 12 are provided to the first filter 13. Among this light, the following three light components pass the first filter 13: (1) light of which having an approximate light bandwidth ranging from 415 nm to 700 nm, (2) light having a wavelength less than 415 nm due to shifting to the shorter wavelengths in the first filter 13, and (3) light the first filter 13 is not able to remove. At this moment, the temperature of the first filter 13 is approximately 250° C. which is sufficiently lower than the maximum characteristic compensation temperature 300° C.

The light transmitted through the first filter 13 is separated by a color separating dichroic mirror 17a. At this moment, a beam (A) comprising mainly of blue light having a wavelength less than 500 nm is reflected and is provided to the absorbing UV mirror 19, and the remaining beam (B) transmits and is provided to the dichroic mirror 17b. A component of the beam (A), having a wavelength is shorter than 420 nm, is absorbed by the absorbing UV mirror 19, and the remaining component is reflected to a collimating lens 14a and provided to the blue light valve 15a. The temperature of the absorbing UV mirror 19 stays at room temperature and no problems occur due to heat resistance. Since light having a wavelength shorter than 420 nm is almost completely removed by the absorbing UV mirror 19, the blue light valve 15a will not be altered.

The beam transmitted through the dichroic mirror 17a has two components, namely, a beam comprising mainly of red colored light having a wavelength longer than approximately 600 nm is reflected by the dichroic mirror 17b to a collimating lens 14b and provided to red light valve 15b. The other component is the remaining beam comprising mainly of green colored light. The remaining beam transmits through the dichroic mirror 17b and collimating lens 14c and is provided to a green light valve 15c.

The beam modulated by the blue light valve 15a and the beam modulated by the red light valve 15b are composited by a color compositing dichroic mirror 18a, while the beam modulated by the green light valve 15c is reflected by the dichroic mirror 18c. These composited and reflected beams are composited by a color compositing dichroic mirror 18b. This composited beam is enlarged and projected onto a screen (not shown) through a projection lens 16 to create an image.

As explained above, the absorbing UV mirror 19 which functions also as the second filter is disposed between the first filter 13 and the blue light valve 15a, which prevents two beams from arriving at the blue light valve 15a. One beam having a wavelength shorter than 415 nm could not be removed by the first filter 13. The other beam is shifted to a shorter wavelength at the first filter 13 and its wavelength is also shorter than 415 nm. The light source 11 may employ a 250W lamp without any alteration or deterioration in the blue light valve 15a. Irregular colors do not occur either because the light shifted to a shorter wavelength which has a wavelength less than 415 nm is cut off by absorbing UV mirror 19.

A second exemplary embodiment is explained with reference to FIG. 3. The second embodiment is a variation of the first embodiment. The absorbing UV mirror 19 shown in FIG. 1 is replaced with a dichroic mirror 20, and the collimating lens 14a is replaced with an absorbing UV collimating lens 21 made of a glass substrate having the same spectrum transmission factor indicated by the curve (2) in FIG. 2. Other structures are same as the first embodiment. The second embodiment can obtain the same result as the first embodiment.

Figure 4:
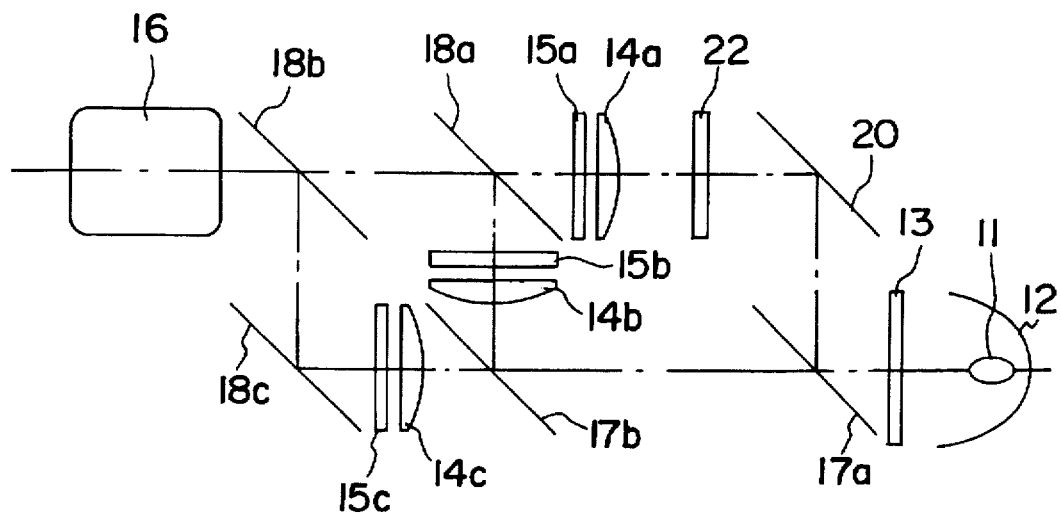
FIG. 4 illustrates an optical system of a video projector according to a third embodiment.

A third exemplary embodiment is explained with reference to FIG. 4. This embodiment is also another variation of the first embodiment. In this embodiment, the absorbing UV mirror 19 is replaced with the dichroic mirror 20. An absorbing UV cut filter 22 made of a glass substrate having the same spectrum transmission factor as shown by the curve (2) in FIG. 2 is disposed between the dichroic mirror 20 and the collimating lens 14a. The other structures are the same as the first embodiment. This embodiment requires more components in its optical system however, the same result as the first embodiment is produced. Instead of disposing the absorbing UV cut filter 22 between the dichroic mirror 20 and the collimating lens 14a, it may be disposed between the dichroic mirror 20 and the color separating dichroic mirror 17a.

Figure 5:
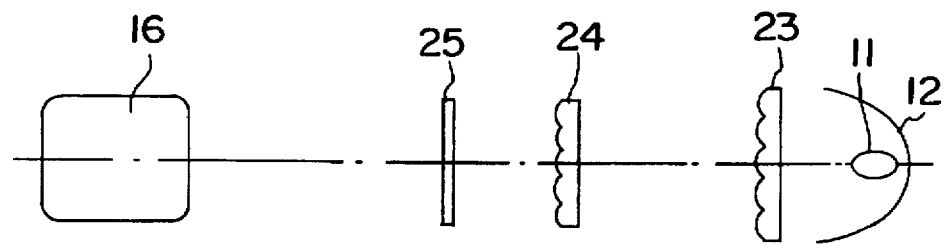
FIG. 5 illustrates an optical system of a video projector according to a fourth embodiment.
Figure 6:
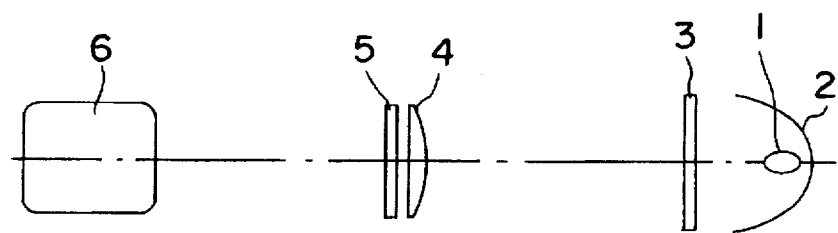
FIG. 6 illustrates a basic structure of an optical system of a conventional video projector.
Figure 7:
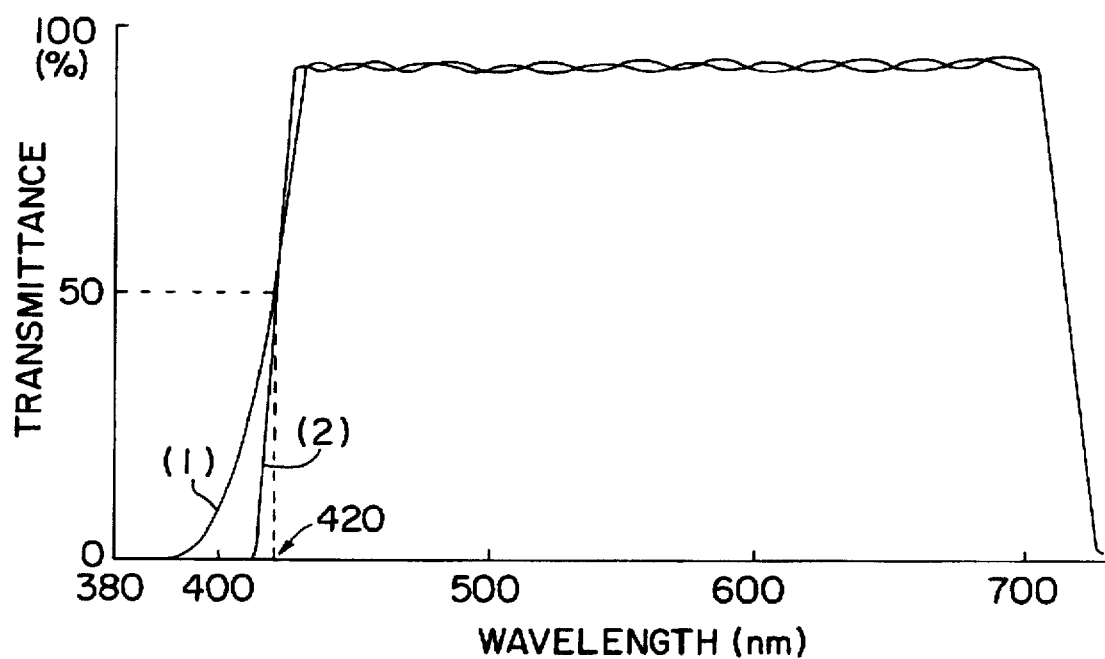
FIG. 7 shows spectrum transmission characteristics curves of both a reflection UVIR cut filter and an absorbing UVIR cut filter.

A fourth exemplary embodiment is explained with reference to FIG. 5. A single-plate-LCD video projector illustrated in FIG. 5 has an optical system comprising the light source 11 made from the metal halide lamp, the reflection mirror 12, a first lens array 23 functioning as the first filter, a second lens array 24 functioning as the second filter, a light valve 25 comprising a transmission LCD panel having a filter for red, green and blue, respectively, and the projection lens 16.

The first lens array 23 comprises a glass substrate with a flat surface having multilayer dielectric films deposited thereon. The first lens array 23 also functions as the absorbing UVIR cut filter, and has the same spectrum transmission factor indicated by the curve (1) shown in FIG. 2.

A second lens array 24 comprises a glass substrate which absorbs light having a bandwidth ranging from ultraviolet to a wavelength within the visible spectrum of light, and transmits visible light. The second lens array 24 has the same spectrum transmission factor indicated by the curve (2) shown in FIG. 2.

When a light emitted by the light source 11 and light reflected by the reflection mirror 12 are provided to the first lens array 23, the following two light components pass through the first lens array 23. First, light having an approximate bandwidth ranging from 415 nm to 700 nm. Second, light having a bandwidth shorter than 415 nm, which the first lens array 23 cannot remove completely. When these transmitted light components are provided to the second lens array 24, light having a wavelength less than 420 nm is absorbed and visible light having an approximate wavelength ranging from 420 nm to 700 nm transmits through the second lens array 24. The transmitted visible light extends through a light valve 25 and the projection lens 16 and is projected on the screen (not shown).

In the single-plate-LCD video projector, as explained above, since the second lens array 24 can absorb light having a wavelength less than 420 nm, an alteration as well as deterioration does not occur in the light valve 25, and irregular colors do not occur either.

In the fourth embodiment, both of the lens arrays 23 and 24 function as filters. However, these two lens arrays can be used as regular lens arrays and filters can be disposed independently. For example, a reflection UVIR cut filter can be disposed at either the left or right side of a first regular lens array, and an absorbing UV cut filter can be disposed at either the left or right side of a regular second lens array. In addition, one of the lens array 23 or 24 can function as a filter and the other one can be used as a regular lens array combined with a cut filter.

In the above four embodiments, the first filter employs the reflection UVIR cut filter having the characteristics of wavelength λ(50)=415 nm and superior heat resistance. The second filter employs the absorbing UV filter having the characteristics of wavelength λ(50)=420 nm and a steep slope on the spectrum transmission factor curve. By shifting the wavelength λ(50) of the second filter to the longer wavelength side of the wavelength λ(50) of the first filter, much more blue color near the wavelength λ(50), e.g. light having a wavelength of 420 nm–430 nm, can arrive at the light valve. Accordingly, the images on the screen become brighter. The wavelength λ(50) of the first filter preferably stays between 400 nm and 420 nm, and that of the second filter stays between 415 nm and 425 nm. The difference between the wavelength λ(50) of both filters stays preferably between 1 nm and 25 nm.

The first filter preferably employs the reflection UVIR cut filter made of a glass substrate because of its superior heat resistance. When using a light source of a higher power consumption, in particular, the glass substrate having a maximum characteristic compensation temperature exceeding 180° C. is recommended due to the excellent heat resistance. When using a xenon lamp of several kilowatts as the light source, the temperature of the first filter rises over 300° C., and the UVIR cut filter preferably employs a heat resistant glass substrate.

The second filter preferably employs a UV cut filter having a steeply sloped spectrum transmission factor near wavelength λ(50). An absorbing filter made of a glass substrate is preferable because of its superior spectrum transmission factor.

As the light source, the metal halide lamp, or discharge lamps such as a xenon lamp, halogen discharge lamp, may be used. A regular halogen lamp or an electrodeless lamp can also be used. The metal halide lamp, among others, is recommended because of its better economic effect and color tone.

As the light valve, a transmission LCD panel or a reflection LCD panel may be used. Other than these LCD light valves, a digital mirror device (DMD) or oil film transmission light valve can be used. The transmission LCD panel is recommended because it enables the video projector to have reduced power consumption and reduced size.

The present invention is not limited to the above exemplary embodiments but can be varied in many ways. Every variation within the spirit and scope of the present invention can be covered by the scope of the appended claims

What is claimed:

1. A video projector for use with a light source comprising:
    a light valve for receiving light emitted from said light source,
    a first cut filter disposed between said light source and said light valve, said first cut filter for removing light having a bandwidth ranging from ultraviolet to a wavelength within the visible spectrum of light and infrared light from said light emitted from said light source,
    a second cut filter disposed between said first cut filter and said light valve, said second cut filter for removing light having a bandwidth ranging from ultraviolet to a wavelength within the visible spectrum of light, and
    a dichroic mirror disposed between said first cut filter and said light valve for separating said light emitted from said light source, wherein said light valve comprises three light valves corresponding to blue, red and green respectively, and said second cut filter is disposed between said dichroic mirror and said light valve corresponding to blue.

2. The video projector of claim 1 wherein a wavelength indicating a 50% transmission rate at said second cut filter is longer than a wavelength indicating a 50% transmission rate at said first cut filter.

3. The video projector of claim 2 wherein the difference between the wavelength indicating a 50% transmission rate at the first filter means and the second filter means is between 1 nm and 25 nm.

4. The video projector of claim 1 wherein said first cut filter comprises a reflection filter for reflecting light having a bandwidth ranging from ultraviolet to a wavelength within the visible spectrum of light and infrared light.

5. The video projector of claim 4 wherein said reflection filter comprises a glass substrate on which a plurality of dielectric layers are layered.

6. The video projector of claim 1 wherein said second cut filter comprises an absorbing filter which absorbs light having a bandwidth ranging from ultraviolet to a wavelength within the visible spectrum of light.

7. The video projector of claim 6 wherein said absorbing filter comprises a glass substrate.

8. The video projector of claim 7 wherein said glass substrate comprises a reflecting mirror for reflecting a visible light.

9. The video projector of claim 7 wherein said glass substrate comprises a field lens for collimating a visible light.

10. The video projector of claim 1 wherein the light source comprises a metal halide lamp and said light valve comprises a transmission-type LCD panel.

* * * * *